(12) United States Patent
Nawracala

(10) Patent No.: US 6,495,016 B1
(45) Date of Patent: Dec. 17, 2002

(54) MICROFLUIDIC MICROCHIP WITH INTEGRATED SUBSTANCE INJECTION

(75) Inventor: Bernd Nawracala, Karlsruhe (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/532,157

(22) Filed: Mar. 21, 2000

(30) Foreign Application Priority Data

Oct. 14, 1999 (DE) .......................................... 199 49 551

(51) Int. Cl.[7] .......................... C02F 1/40; C02F 11/00; C25B 11/00; C25B 13/00; C25B 9/00; G01N 27/27; G01N 27/403; G01N 27/453

(52) U.S. Cl. ........................ 204/604; 204/643; 204/666

(58) Field of Search ................................. 204/643, 666

(56) References Cited

U.S. PATENT DOCUMENTS

| | | | | |
|---|---|---|---|---|
| 4,908,112 A | * | 3/1990 | Pace | 204/601 |
| 5,126,022 A | * | 6/1992 | Soane et al. | 204/458 |
| 5,750,015 A | * | 5/1998 | Soane et al. | 204/451 |
| 5,800,690 A | * | 9/1998 | Chow et al. | 204/451 |
| 5,858,195 A | | 1/1999 | Ramsey | |
| 5,965,001 A | | 10/1999 | Chow et al. | |
| 5,976,336 A | * | 11/1999 | Dubrow et al. | 204/453 |
| 6,074,827 A | * | 6/2000 | Nelson et al. | 435/6 |
| 6,174,675 B1 | * | 1/2001 | Chow et al. | 204/164 |
| 6,306,659 B1 | * | 10/2001 | Parce et al. | 422/55 |
| 6,326,083 B1 | * | 12/2001 | Yang et al. | 427/2.25 |
| 6,331,274 B1 | * | 12/2001 | Ackley et al. | 422/50 |
| 6,342,142 B1 | * | 1/2002 | Ramsey | 204/450 |

FOREIGN PATENT DOCUMENTS

WO 98/49548 11/1998

OTHER PUBLICATIONS

A. Van Den Berg and P. Bergveld (eds.), *Micro Total Analysis Systems*, MESA Research Institute, University of Twente, The Netherlands (title page and table of contents).

* cited by examiner

*Primary Examiner*—Jill Warden
*Assistant Examiner*—Jennine Brown

(57) ABSTRACT

A microfluidic microchip includes a channel structure having a delivery channel connected in a substance conductive manner to a separation channel. Laterally offset discharge channels are at connection points displaced from a connection point between the delivery and separation channels. Between the connection points on the one hand and the connection point on the other are channel sections having concordant channel lengths. By imposing suitable electrical potentials along these channel sections, the filling volumes present in the channel sections are satisfactorily homogenous after a certain period of time to form a representative part of a substance specimen. Substance volume units are formed in these channel sections. The lengths of the volume units are determined exclusively by the lengths of the channel sections. Pulse-shaped substance volume sequences are injected into the separation channel. The signal-to-noise ratio of the measurement results is substantially improved by generating substance volume sequences on the basis of pseudo-randomly scattered binary digit sequences similar to Hadamard sequences, and by a cross-correlation analysis of spectra measured on the basis of such substance volume sequences.

27 Claims, 5 Drawing Sheets

MICROFLUIDIC MICROCHIP WITH INTEGRATED SUBSTANCE INJECTION

Figure 1:
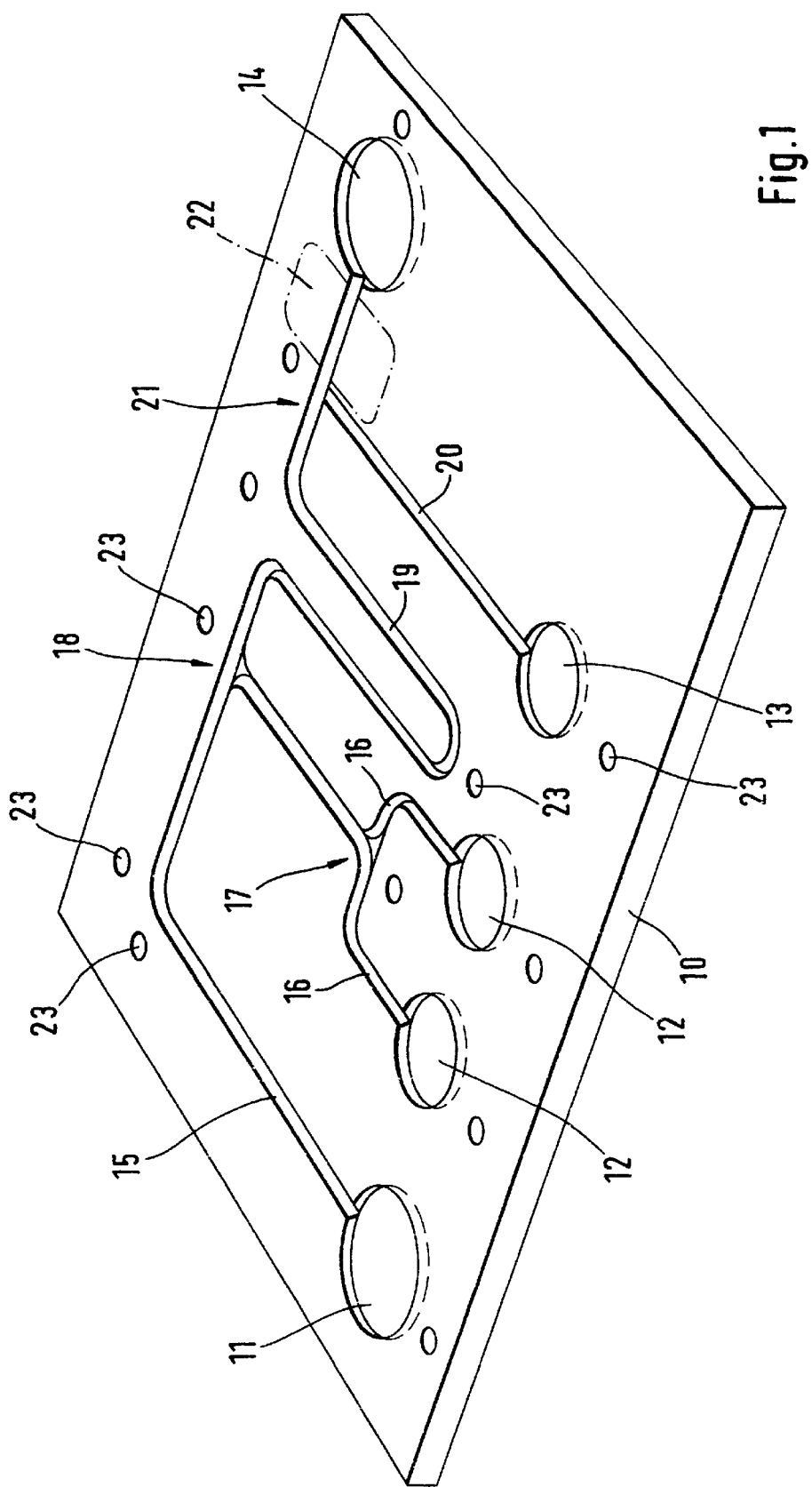

The invention relates to general measuring systems in the sector of analytical laboratory technology, in which microfluidic microchips are used for the chemical, physical, and/or biological analysis or synthesis of substances, which feature a channel structure by means of which the substances, with the imposition of a physical potential, and of an electrical or hydraulic potential in particular, are capable of movement in accordance with the channel structure. The invention relates in this context, in particular, to the injection of substances into such a microfluidic microchip.

A microchip of the type described in the preamble, and a corresponding microchip laboratory system, are described, for example, in U.S. Pat. No. 5,858,195. In a microchip of this kind, the substances concerned are moved by means of a system of channels connected to one another and integrated on the microchip. The movement of these substances in these channels is controlled by means of electrical fields, which are imposed along these transport channels. Because of the high-precision control of the substance movement which this makes possible, and the very exact metering capacity of the substance masses moved in each case, the substances can be mixed precisely with regard to the stoichiometry required, can be divided, and/or can induce chemical or physical-chemical reactions. With this microchip, the channels provided for in the integrated structural design feature a plurality of substance reservoirs, which contain the substances required for the chemical analysis or synthesis. The movement of the substances from these reservoirs along the transport channels is effected in this case by electrical potential differences. The substances moving along the transport channels accordingly come in contact with different chemical or physical environments, which then make possible the required chemical or chemical-physical reactions between the individual substances. In particular, the microchip features one or more crossings between the transport channels, in which the intermixing of the substances takes place. By the simultaneous use of different electrical potentials on the different substance reservoirs, it becomes possible for the volume flows of the different substances to be selectively controllable by means of one or more crossing points, and therefore, solely on the basis of the electrical potentials applied, for a precise stoichiometric yield to be effected.

The movement of the substances by means of electrical high voltage in this situation, however, represents only one variation. For example, it is possible for the potential difference required for the movement of the substances also to be implemented by means of imposing a pressure means on the substances, for preference a suitable gas means such as a noble gas. The movement of the substances can also be effected by the use of a suitable temperature profile, in which situation the movement takes place due to the thermal expansion of the particular substance. The selection of the individual means for the provision of a potential or of a force for the movement of the substances on the microchip is based in this case in particular on the physical properties inherent in the individual substances. In the case of substances with charged particles, such as charged or ionized molecules or ions, the movement of the substances is effected for preference by means of an electrical or electro-magnetic field of suitable strength. The path which the substances pass over in each case is calculated in this situation in particular on the basis of the field strength and the duration of the field applied. The movement of the substances is effected in this case either etectrokinetically, in other words, in the case of charged substances, due to the effect of the external electrical field on the charge which is present in each case. As an alternative, or in parallel with this, the movement of the substance can be effected by electro-osmosis in the case of substances (particles) in solution in solvents, in which situation the solvent is essentially moved on the basis of a charged double layer being formed with many materials, such as glass, on the surface which is adjacent to an electrolyte, and accordingly incurring a net counter-current of the substances. In the case of substances which are free of an electrical charge, however, or which are not in solution, the movement of the substances is effected in most cases with the aid of what is referred to as a flow means.

The microfluidic microchips described are therefore particularly characterised by the fact that, because of the very small dimensions of the transport channels on the microchip, only relatively small volumes of substance are moved, in the range from picolitres to nanolitres. An analysis or synthesis of small substance volumes of this type therefore also implies extremely high-resolution detection devices for the measurement of these small substance masses. The measurement resolution of such measuring devices is therefore largely determined by the sensitivity of the detector used in each case, as well as the underground noise caused by the measurement arrangement as a whole.

It is known that the signal-to-noise ratio of the measuring devices concerned in this case can in principle be substantially improved by the tests which are to be conducted in each case being carried out several times, and by mean values then being formed from the measuring results obtained. With this procedure, however, it must be borne in mind that certain tolerances are to be maintained between the repeated measurement cycles, in order in particular to avoid the mixing of substances or the superimposition of the measurement signals detected. These dead periods and the pulse widths in each case for the injection of substances therefore also determine, conversely, the minimum duration of a measuring cycle, and therefore also directly determine the limits of the signal-to-noise ratios which can in principle be achieved.

In addition to this, the measurement cycle can also in principle be shortened by multiple substance injection during an analysis attempt, in particular when substance separation is being carried out. This has the disadvantage, however, that the measurement signals which are superimposed in this process must subsequently be relatively laboriously disentangled. It is often also not possible to carry out subsequent disentanglement of the measurement signals with sufficient precision.

The object underlying the invention is to provide a microfluidic microchip of the type concerned, as well as a process for its operation, with which, despite the physical and technical restrictions described heretofore, the signal-to-noise ratio can be improved in comparison with the pertinent prior art during the performance of the tests described.

A further object involves achieving such improvement withoutstantial volumes of the substance to be processed being required, or additional costs being required for the manufacture of such microchips.

These objectives are achieved according to the invention by the features of the independent claims. Preferred and advantageous embodiments of the invention are described in the dependent claims.

According to a first variant of the microchip according to the invention, provision is made in particular for the fact that, in a first operating cycle or a first operating phase, a leading channel or leading channel section can be filled with a continuous substance flow by the imposition of a constant potential on a feed channel and a discharge channel, whereby the individual substance components, in particular the slowest moving substance components, extend continuously and homogenously along the leading channel. Once a continuous volume flow of substance of this kind has been formed, the substance volume contained in the leading channel can to advantage be guided out of the leading channel by switching over the potential, and can be injected into a channel provided for the conduct of the test.

By means of this type of substance injection, spatially precisely defined substance and volume units can to advantage be generated. By the use of an appropriately modulated potential, these substance-volume units can be conducted out of the leading channel section. By the use of a specified sequence of pulses, the appropriate substance volume sequences can then be generated.

The proposed channel structure can for preference be operated in two operational cycles or phases, in which situation it is possible to switch over between the two operating cycles by means of switching means. In a first operating cycle, the substances are continuously conducted into the leading channel section, and in the second operating cycle are then lead out of the channel section by the application of said modulated potential.

The generation of even more complex substance volume sequences can be achieved by making provision for at least two leading channel sections. This makes it possible for substance volume units of different lengths, in particular of a multiple of a unit length, to be generated in one operating cycle. For example, the substance volume units contained in two leading channel sections arranged next to one another can be guided out of this leading channel section by the application in one operating section of a suitable potential, as a result of which a substance volume unit is generated of twice the length of the unit length defined by the individual leading channel sections.

According to a further embodiment, a substance-conducting buffer reservoir connected to the leading channel is provided for the intermediate storage of substance volume units which have already been generated. With this embodiment, the substance volume units are accordingly first conducted to the buffer reservoir and only then conducted out of this to a channel provided for the actual performance of the test. To carry out the test, it is possible in this situation in particular to provide for a substance-conducting separation channel connected to the leading channel and the buffer reservoir respectively. To accommodate substances in the separation channel which have already been subjected to potential it is possible to make provision to advantage of a collecting reservoir connected to the separation channel in such a way as to conduct the substance.

The microchip proposed according to the invention can also be designed in such a way that, by means of a first and second activation means a potential of a different type in each case can be provided, in particular an electrical potential with the first activation means and a mechanical (hydraulic) potential with the second activation means, or vice-versa.

In a second variant, the microchip according to the invention features in particular a channel structure with a feed/discharge channel for feeding/discharging the substances, which is connected in a substance-conducting manner at a crossing point with a separation channel for carrying out the chemical analysis or synthesis. In order to build up a potential for the continuous movement of the substances in the feed/discharge channel, provision is made in this situation for first activation means. In addition, second activation means are provided for creating a temporally-modulated or amplitude-induced potential, by means of which the substances located in the separation channel are capable of modular movement, which is turn allows for the formation of the substance volume units separated accordingly by the modulated potential. With this embodiment of the channel structure, by contrast with the first variant, the substance volume units are generated in intersecting transport channels by means of suitable activation means. This variant is based on the concept of conducting a continuous volume flow through such a channel intersection, and, in a second operational phase, switching over the potential required for the movement of the substances for a specified period of time, in such a way that the continuous volume flow is diverted during the specified period of time via a further transport channel. By re-establishing the potential state which prevailed in the first operational phase, it is then possible to generate overall substance volume units of adjustable sizes. The concept on which this variant is based consists to a certain extent of providing the substance volume units in particular by means of an electrically switchable set of channel points. This variant accordingly requires in principle only minor changes to the channel structure in comparison with the first variant.

It is emphasised that both variants feature the advantage, in comparison with the prior art that the constant and continuous volume flow generated in the first operating phase leads to advantage to a situation in which even relatively slow moving substance components can extend or spread over the entire volume of the individual volume unit, and therefore reproducibly mixed and extremely homogenous substance mixtures can be injected as substance volume units into a separation channel.

In addition to this, both variants have the advantage in common that the individual injectors in each case are capable of being controlled exclusively by the application of an electrical potential, and an electrical voltage in particular, and accordingly require no moving parts at all.

In addition to this, with the proposed microchip it is possible for extremely readily reproducible volume units to be generated for the injection, whereby the standard deviation is approximately in the range of a few percent. This very precise production of injection volumes, together with the relatively low dead times or response times can be applied to advantage for the generation of predetermined injection sequences or substance/volume sequences. In particular, with such microchips, the randomly-scattered substance volume sequences described in detail hereinafter can be generated for injection into a separation channel of such a microchip.

It is self-explanatory that provision can also be made with the second variant for the switchover between the two operating phases to be automated by means of suitable switching means.

The invention further relates to a measurement device and a process for the operation of a microfluidic microchip of the type described heretofore. With the measuring device according to the invention, provision is made in particular for generator means for the creation of the constant potential required in the first operating phase, as well as foe the production of the modulated signal (potential) required in the second operating phase, which can in particular be arranged combined in one single signal generator. For preference, the switchover between the two operating phases is capable of being automated by means of suitable switching means.

To generate a temporally alternating potential, provision can also be made for a signal generator which generates pulsed signals with essentially constant amplitude and variable oscillation duration and oscillation phase. The signal generator may in particular be designed as a square-wave generator. A square-wave generator allows in particular for the production of normed substance volume flows, and therefore of correspondingly precisely adjustable substance volume units.

According to a particularly advantageous further embodiment of the device according to the invention, provision can be made for the generator means for the production of the temporally or amplitude alternating potential to be triggered by means of pseudo-randomly scattered binary digit sequences created by a processor unit. These binary digit sequences may in this situation represent, in particular, binary bit sequences similar to Hadamard sequences. This allows for the measured spectra to be converted into an electropherogram by means of a cross-correlation analysis or calculation of the spectra measured in each case, by making recourse to the injected substance volume flows and the resultant measurement signals. The signal-to-noise ratio of the resultant electropherogram in particular is then substantially improved, as explained in detail hereinafter.

The invention is described hereinafter on the basis of embodiment examples, making use of drawings. In conjunction with the features of the patent claims, further objectives, advantages and features of the invention are derived.

Figure 2:
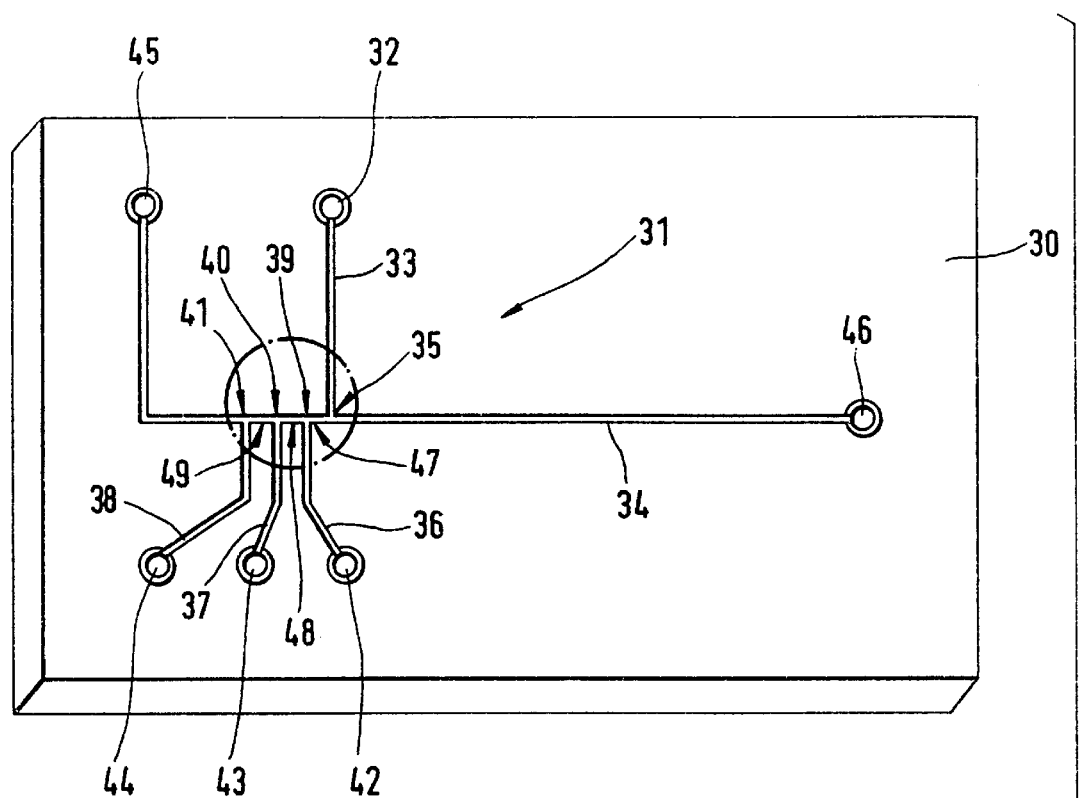
Figure 2:
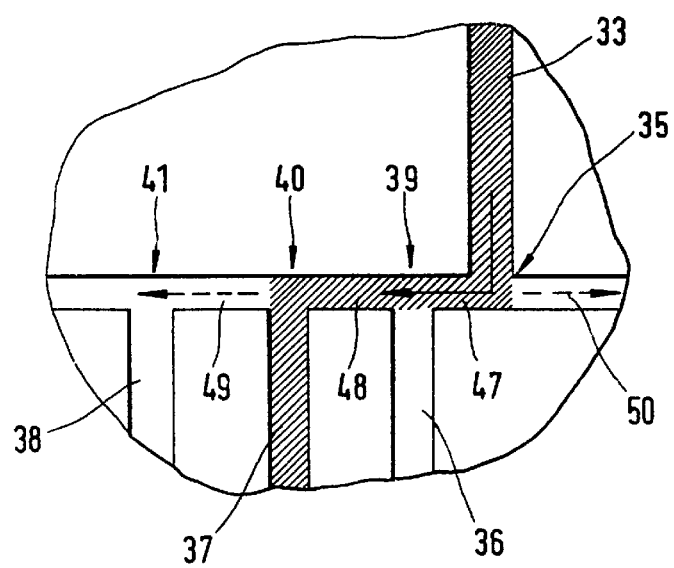
Figure 3:
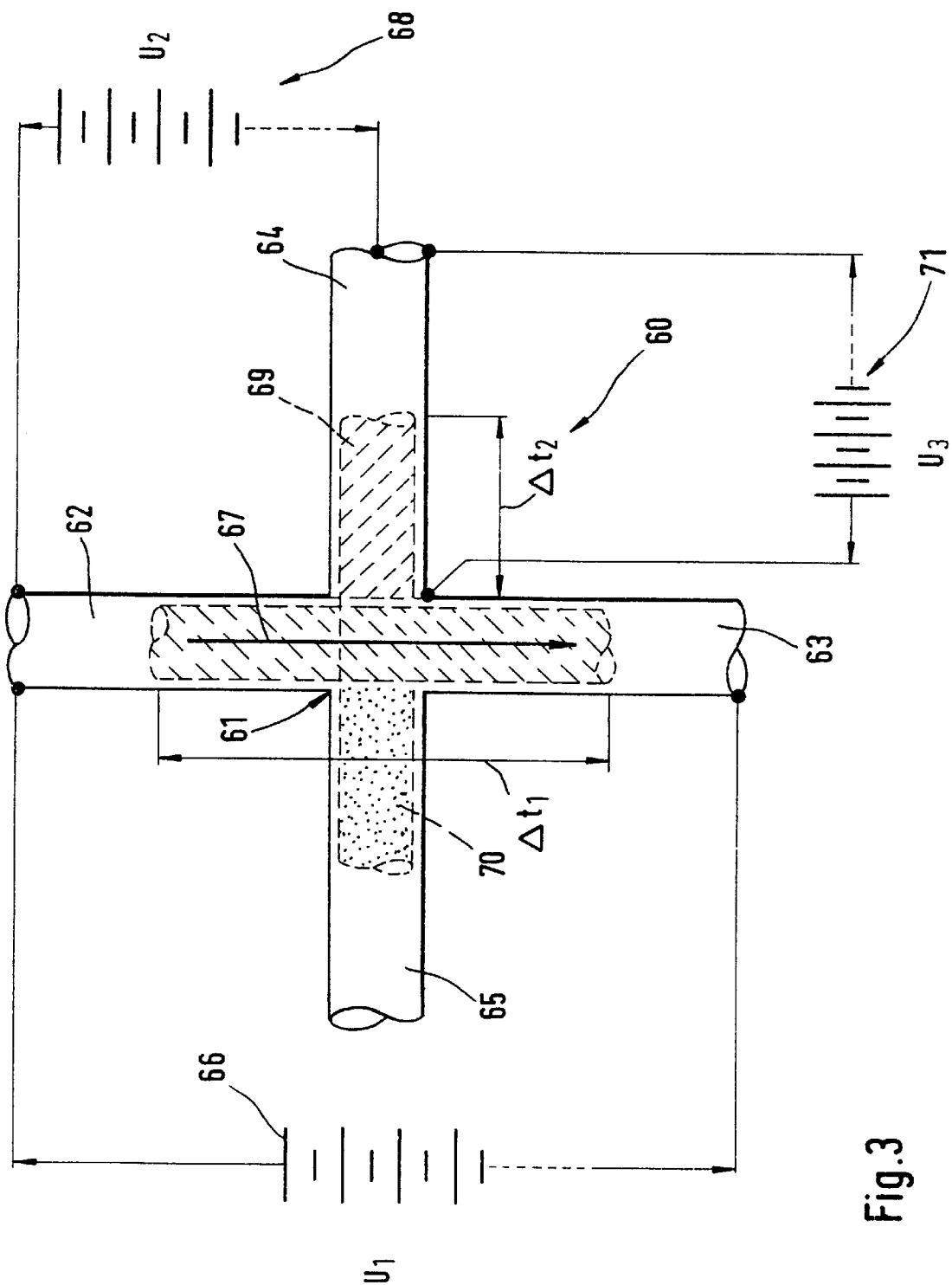
Figure 4A:
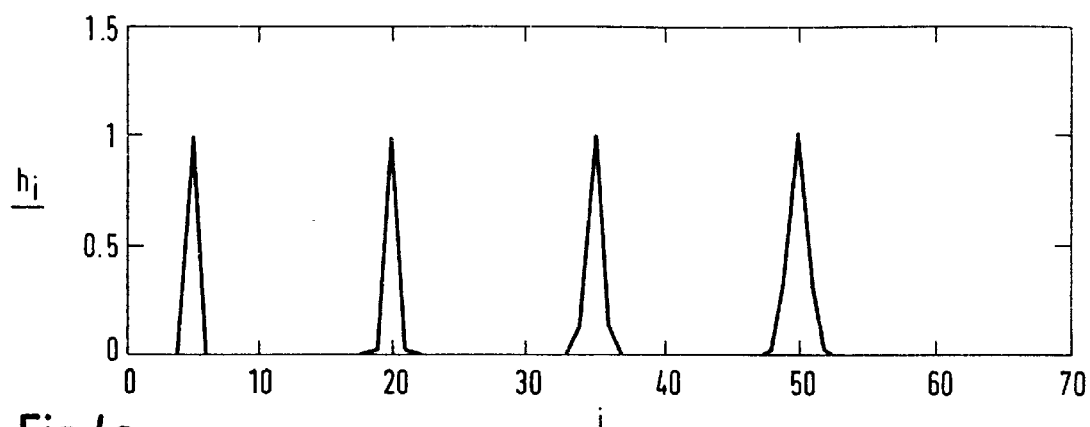
Figure 4B:
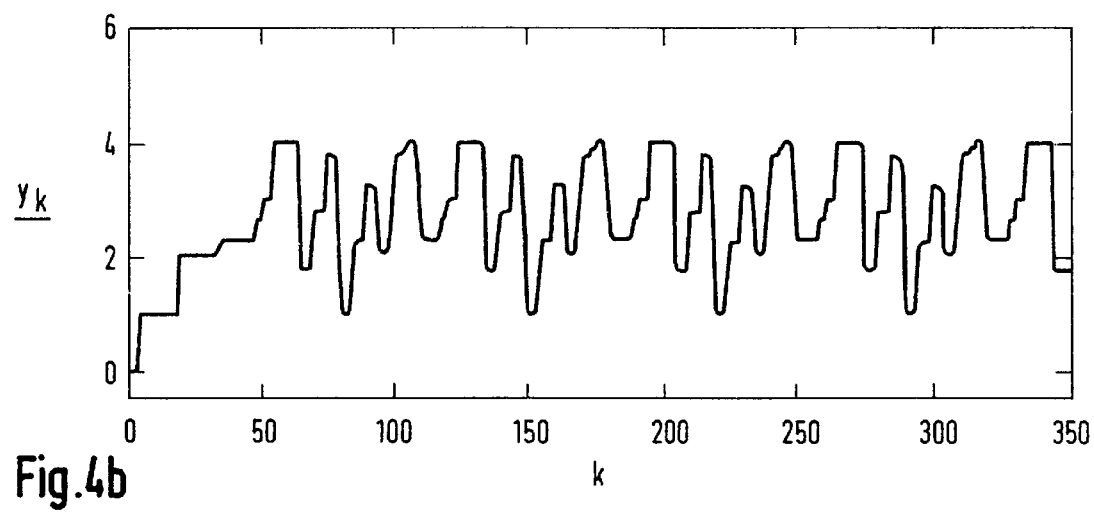
Figure 4C:
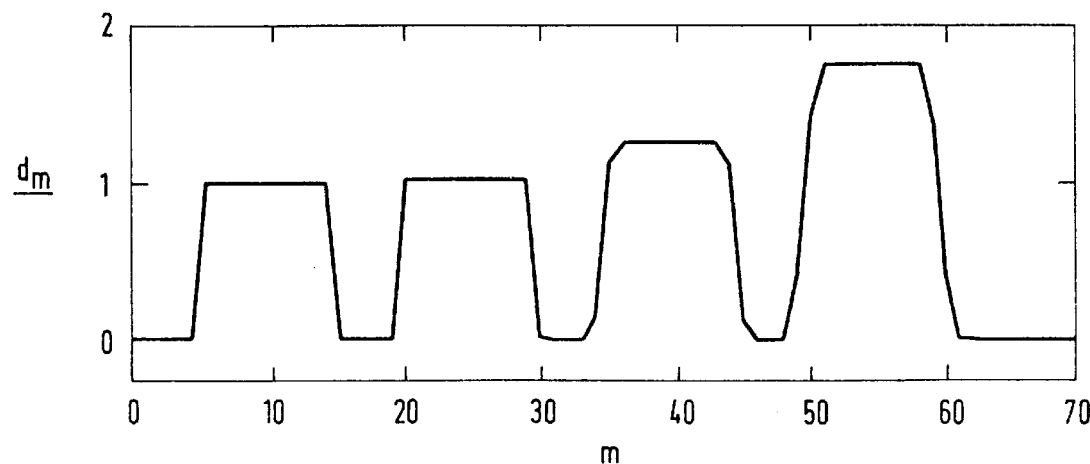
Figure 5A:
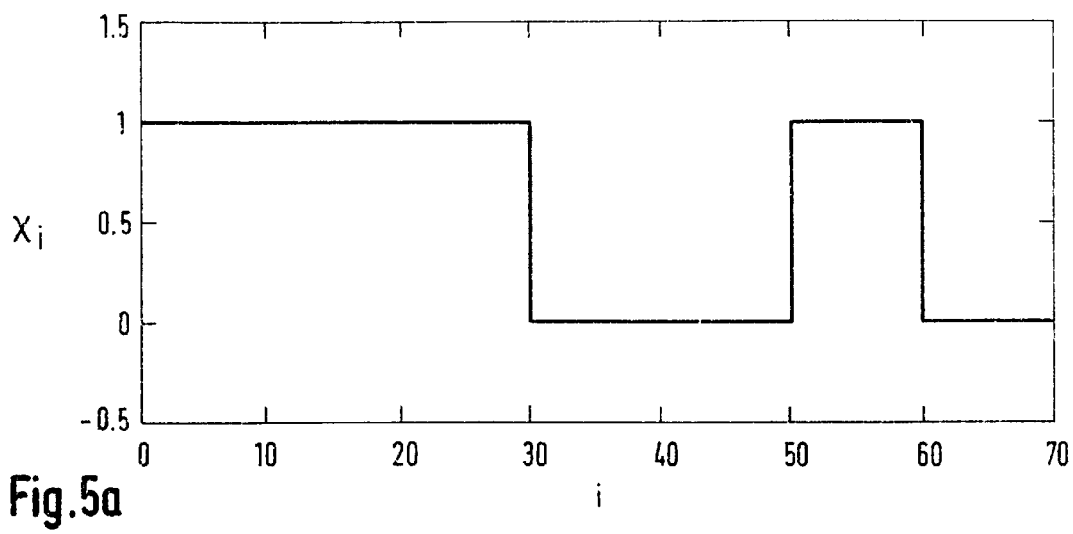
Figure 5B:
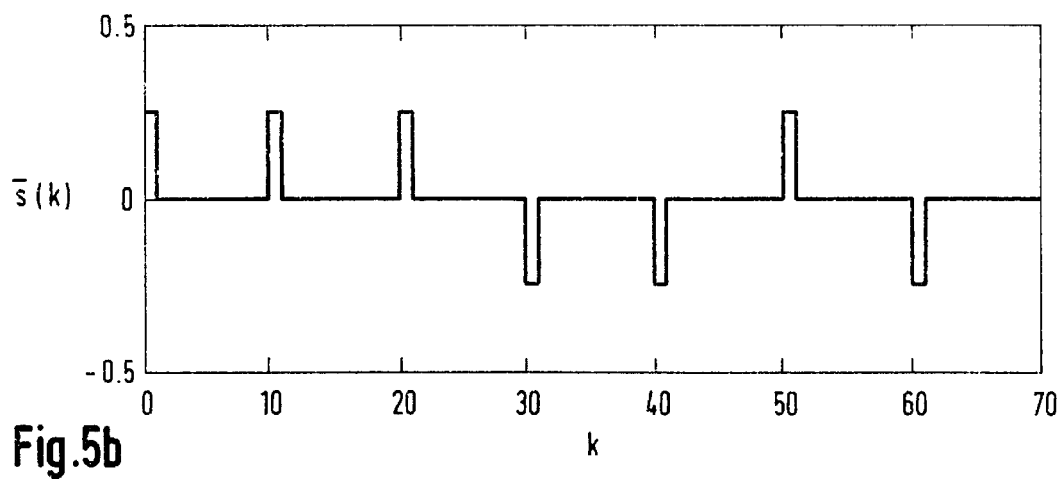
Figure 5C:
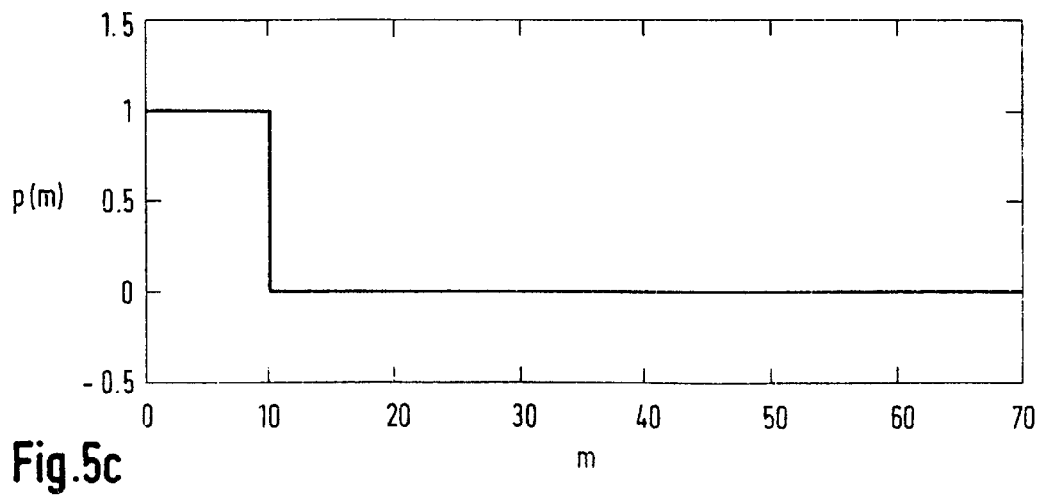

Specifically, the drawings show:

FIG. 1 A perspective view of a microfluidic microchip according to the prior art;

FIG. 2 An embodiment of a microfluidic microchip according to the invention, according to the first variant of the invention;

FIG. 3 An embodiment of a microfluidic microchip according to the second variant of the invention;

FIGS. 4a–c Examples of schematic signal curves, which show, in detail:
  a) A typical pulse response (or a detector signal) occurring at a measuring instrument according to the invention, with an infinitesimally wide injection pulse,
  b) A typical detector signal during a randomly scattered bit-encoded injection according to the invention,
  c) A typical electropherogram according to a mathematical development of the measured signal, carried out according to the invention; and FIGS. 5a–c Three examples of pulse injection sequences according to the invention, and specifically, in detail:
  a) An injection sequence created from a randomly-scattered bit sequence (1,1,1,0,0,1,0) of length N=7, with individual injections of pulse width w=10,
  b) A sequence s belonging to the bit sequence $\bar{s}$ from FIG. 5a, used for the development (for details, see Description text), and
  c) An individual injection pulse of width w=10, reconstructed by means of correlation of the sequences from FIGS. 5a and b.

FIG. 1 shows a perspective view of a microfluidic microchip according to the prior art. Applied on the upper face of a substrate or carrier 10 is a channel structure which serves to accommodate and transport substances. The carrier 10 may be made, for example, of glass or silicon, whereby the microstructures can be manufactured by chemical or laser-supported etching or similar processes.

To accommodate the substance(s) to be examined on the microchip, one or more indentations 11 are provided on the carrier, which serve as a reservoir for the substances. For the purpose of carrying out the test, the substances are first moved along a transport channel 15 on the microchip. In the embodiment in question, the transport channel 15 is formed by a V-shaped groove. Other designs of the transport channel are however also possible, such as cut-outs or grooves of rectangular or circular profile.

Accommodated in additional depressions 12, likewise serving as substance reservoirs, are the reagents required for conducting the tests. In the example in question, this involves two different substances. By means of appropriate transport channels 16 these substances are initially conducted to an intersection 17 by means of suitable transport channels 16, where they form the substance product which is finally to be used by means of mixing and, if appropriate, chemical analysis or synthesis. At a further intersection 18 this reagent then impinges on the substance(s) to be examined, at which point both substances are likewise intermixed.

The substance thus formed then runs through a meander-shaped transport channel section 19, which essentially serves to enlarge the channel paths available for the reaction between the substance which is to be examined and the reagent. In a further depression designed as a substance reservoir, in the example in question another reagent is contained, which is conducted to the substance mixture already present at another intersection 21.

In the example in question, the substance reaction which is actually to be investigated takes place directly adjacent to the point of intersection 21 referred to above. The substance reaction is in this situation detected within a channel area 22 (or measuring field respectively) of the transport channel, by means of a detector not shown here, for preference free of contact. The detector concerned may in this case be arranged above or below the area 22. After the substance has run through the area 22 referred to, it is conducted to another depression 14, which represents a substance sink for the substance wastes formed during the overall reaction.

Finally, provision is made on the microchip for depressions 23, which serve as contact surfaces for the application of electrodes, and which allow for the microchip to be subjected to the electrical voltages or hydraulic gas pressures, as applicable, required for the operation of the chip. As an alternative, the contacts for the chip can also be provided by introducing an appropriate electrode tip directly into the depressions 11, 12, 13, 14 provided for the accommodation of the substances. By means of a suitable arrangement of the electrodes 23 along the transport channels 15, 16, 17, 19, 20, and an appropriate temporal and/or dimensional concordance of the fields applied, it is now possible for the movement of the individual substances to be effected in accordance with a precisely predetermined time and quantity profile, so that the kinetics of the reaction process on which the procedure is based in each case can be very precisely taken into consideration or maintained.

In the event of a gas-pressure powered movement (not shown here) of the substances, the transport channels are to be designed as completely enclosed conduits, for example as hollow channels with circular or rectangular cross-sections. With such a design it is therefore necessary for the depressions 23 to be formed in such a way that corresponding pressure supply lines can engage in these in such a way as to form a seal, in order for a pressure means such as a noble gas to be introduced into the transport channels.

FIG. 2 shows one of the first variants of embodiment according to the invention of a microfluidic microchip 30 with a channel structure 31 formed according to the invention. The substances which are to be processed on the microchip 30 are first conducted to a specimen reservoir 32, which is connected to a delivery channel 33 in such as way as to convey substances. The delivery channel 33 in turn is connected at its other end to a separation channel 34 in such a way as to conduct substances. Arranged laterally offset, opposite the connection point 35, in the example in question, are three discharge channels 36–38, which are connected at corresponding connection points 39–41 to the separation channel 34 in such a way as to conduct substances, and in each case empty into collecting reservoirs 42–44. At the ends of the separation channel 34 in each case are a buffer reservoir 45 and a collecting reservoir 46. The channel sections 47–49 formed in each case between the connection points 39–41 on the one hand and the connection point 35 on the other feature concordant channel lengths, which in each case correspond to what is referred to as a unit channel length.

It is to be noted that the channel structure in the area of the channel sections 47–49 is designated as a "leading channel", since within this channel structure it is not the actual substance separation which takes place but the control of the volume flows to create the substance volume units referred to.

Substance movement between the delivery channel 33 and the discharge channels 36–38 and the collecting reservoirs 42–44 on the one hand and the buffer reservoir 45 and the collecting reservoir 46 on the other is effected in the example shown by the imposition of suitable electrical potentials along the channel structure 31. As an alternative, however, the movement may also be effected by the imposition on the channel structure 31 of a suitable pressurised gas, e.g. a noble gas. In a first operating phase, after the substance sample has been brought into the specimen reservoir 32, an electrical potential is imposed between the specimen reservoir 32 and one of the discharge channels 36–38 or the corresponding collecting reservoirs 42–44, in order in this way to effect the movement of the substance specimen between the delivery channel 33 and one of the discharge channels 36–38.

In the example in question it is further assumed that the substance movement is to be effected via the two channel sections 47 and 48, opening into the discharge channel 37. To clarify the processes which take place in this situation, they are only explained on the basis of a section enlargement of the channel section area 47–49, likewise shown in FIG. 2. By the application of as constant a potential as possible between the delivery channel 33 and the discharge channel 37 or the collecting reservoir 43 over a certain period of time, for example a few seconds, an approximately constant and continuous substance volume flow is formed between the delivery channel 33 and the collecting reservoir 43, which is shown in the section enlargement shown as a hatched area. After this reasonably stationary status has been set, it is guaranteed in particular that even the slowest moving substance component will fill the filling volume present in the channel sections 47, 48 referred to, in an adequately homogenous manner, and the substance volume flow present in this area will therefore provide a representative part of the substance specimen.

Once this state has been established, the second operating phase then takes place, in which first the electrical voltage imposed between the delivery channel 33 and the discharge channel 37 or the collecting reservoir 43 is interrupted and an electrical voltage is then imposed between the buffer reservoir 45 and the collecting reservoir 46. Switchover between these two electrical voltages is effected for preference by means of a conventional electrical or electronic switch (not shown here). Depending on the polarity of the voltage which is now applied, the substance volume unit present in the channel sections 47, 48 moves either in the direction of the buffer reservoir 45 or in the direction of the collecting reservoir 46. The length of this substance volume unit is accordingly determined exclusively from the channel section length 47, 48 pertaining, which in the first operating phase can be adjusted by the imposition of a suitable electrical potential. In the example in question, the substance volume unit injected into the separation channel 34, for example in the direction of the collecting reservoir 46, features a double unit length. By means of the channel structure 31 proposed according to the invention, this accordingly allows for substance specimens of differing volume sizes to be injected into a separation channel 34, and by successive continuation of the specified operating stages more complex substance volume sequences can be fomied.

FIG. 3 shows a preferred embodiment of the second variant of the invention, of a microfluidic microchip, and specifically a sectional enlargement of a channel structure provided for on such a microchip. As a departure from the embodiment shown in FIG. 2, 40 the creation of the substance volume units is not effected in this case by the substance being guided through suitable channel sections 47–49, which represent a multiple of the unit length referred to. Rather, in the variant in question, the substance volume units are generated exclusively by temporal actuation of the electrical fields imposed, whereby recourse can be made to a conventional channel structure.

The section 60 shown in FIG. 3 of an overall more complex channel structure features an intersection 61 between a delivery/discharge channel 62, 63 and a separation channel 64, 65. The terms "delivery" and "discharge" channel are to be understood in this connection as purely functional, and designate only the areas of such a channel which are intended in each case to provide for delivery and discharge respectively. The term "separation channel", on the other hand, designates, likewise understood purely functionally, a channel or channel area in which a separation of substances or, in general, an analysis or synthesis of substances can be carried out. It is understood that the functional allocation indicated, and the terminology used for the individual channels or channel areas, is purely arbitrary, and is in no way to be understood as restrictive on the concept according to the invention. In the example in question, the area 62 of the delivery/discharge channel 62, 63, now located above the point of intersection 61 is now shown as the delivery channel, and the area 63 below the point of intersection 61 is designated as the discharge channel.

By the application of an electrical potential 66, e.g. of a constant electrical voltage $U_1$, between the delivery channel 62 and the discharge channel 63, in a period of time $\Delta t_1$, in a first operating phase a continuous and constant volume flow 67, extending beyond the point of intersection 61 is generated in the delivery/discharge channel 62, 63. After the imposition of a static substance flow, the electrical voltage $U_1$, as in the other embodiments, is temporarily disconnected, and a second potential 68, in the example in question applied between the delivery channel 62 and the separation channel area 64, for preference an electrical voltage $U_2$, is generated. Because of the potential circumstances which are altered in this way, in this second operating phase a volume segment 69 is carried over from the delivery channel 62 into the separation channel area 64. As an alternative, it is possible, by reversing the polarity of the voltage $U_2$ applied, for a corresponding or similar volume segment 70 to be diverted into the separation channel area 65.

After the voltage $U_2$ has been imposed for a period of time$\Delta t_2$, and the volume segment 69 shown has flowed into the separation channel area 64, the voltage $U_2$ is switched off again. By switching the voltage $U_1$ back on, the situation is reached in which the volume flow 67, corresponding to the first operating phase, can flow again (statically). By connecting another potential 71, for preference a constant electrical voltage $U_3$, the volume segment 69, separated from the original volume flow 67, 69, is transported further (to the right) in the separation channel area 64. By the appropriate temporal switching of the electrical fields referred to, a situation can be reached in which substance volume units of predetermined length and therefore of predetermined mass can be injected into the separation channel section 64.

In order to improve the signal to noise ratios of a test being carried out on a microchip of the type described heretofore, the test is carried out in accordance with the operating procedure described in detail hereinafter. The detection of the measurement results on a substance or substance volume units present in the separation channel can be effected by means of known methods, in particular by means of contact-free optical procedures such as optical interference spectroscopy or mass spectroscopy. By means of the channel structure according to the invention described earlier, in this situation discontinuous pulsed substance volume units are generated, which in particular do not obey the hydrodynamic conditions according to the Hagen-Poiseulle law.

These substance volume sequences accordingly allow for the application of known modulation or auto-correlation techniques, which are known from other sectors such as time-of-flight spectroscopy or molecular radiation scatter. In particular, the modulation technique of what is known as "pseudorandom chopping" comes into consideration. The principle is further known, in this context, of implementing an improved signal-to-noise ratio by the use of what is referred to as a "Hadamard modulation". Randomly scattered binary bit sequences (pseudorandom binary sequences "PRBS") are already being used in many sectors of spectroscopy, for example molecular radiation scattering, time-of-flight mass spectroscopy, and capillary electrophoresis, for the purpose indicated.

The generation of such randomly-scattered binary sequences is effected, for example, by means of feedback shift registers, the output of which is conducted back via an exclusive-or (XOR) logic circuit to the shift register input. These known methods are disclosed, for example, in articles by Harwit, M. et al. in Hadamar Transform Optics (Academic New York, 1979), or in Buck et al in Review Scientific Instruments 67, 41–7422 (1996).

By means of the injection of such temporally-modulated substance volume sequences during a substance separation carried out in a separation channel, for example, it is then rendered possible, as described in detail mathematically hereinafter, for an original electropherogram to be reconstructed.

The measurement signal detected during a test now represents the superimposition of all the signals generated on the (separation) channel in each case, on the substance volumes present in each case, and is mathematically developed by the methods described in detail hereinafter by way of a cross-correlation analysis. The resultant electropherogram, often referred to as a "correlogram", then features a signal-to-noise ratio which is perceptibly improved in comparison with the conventional injection methods. This improvement results essentially from the increase in the number of the operating cycles running during the entire performance of the test, referred to as the "Fellgett Advantage". On the assumption that the noise is independent of the signal, this advantage can be explained by the fact that the signal, is enlarged in amplitude because of the plurality of the measuring cycles, while by contrast the noise amplitude remains approximately constant. The PRBS theory underlying this has been frequently described in the technical literature, and is outlined briefly hereinafter, only in the context of the present invention.

Examples of measurement results obtained with PRBS-modulated injection are shown in FIGS. 4 and 5. In the case of a pulse response, shown in FIG. 4a, deriving during a measurement of such a pulse sequence, on injection of an individual pulse (FIG. 5c) of width w=10, the detector signal shown in FIG. 4c is obtained. In the case of cyclic application of the injection sequence shown in FIG. 5a, the detector signal features the curve shown in FIG. 4b, from which the underlying measurement signal (FIG. 4c) can only be reconstructed by correlation with the pulse sequence illustrated in FIG. 5b.

As mentioned earlier, the PRBS theory is widely described in the literature, and will therefore only be outlined in brief hereinafter. On the assumption of linear overlaid signals and the presence of stationary conditions in the substance volume flows, a discrete detector signal $y_i$ can be described of a substance separation system concerned here, as an overlay (folding) of an input value (pulse) $x_i$ and a response value (pulse) $h_i$ of the system (FIG. 4), and specifically as a fold $y=x*h$ of these two signals. Explicitly, the following sum or integral respectively is therefore derived:

$$y_j = \sum_{i=0}^{N-1} x_{j-i} h_i. \tag{1}$$

While with conventional substance injection the value x represents a simple pulse p of pulse width w, and therefore the expression $y=p * h$ corresponds directly to the electropherogram which is to be measured, the situation with random-scatter coded substance injection, in particular when based on a pulse sequence similar to a Hadamard, of length $N=2^n-1$ with $2^{n-1}$ (where n>1 is a whole number) injections of pulse width w, is entirely different. The detector signal does not correspond directly to the electropherogram which is to be measured, and consists rather of a sum total of temporally displaced measuring signals as a response to multiple substance injection.

From this point of view, sequences s which are similar to Hadamard offer a usable size, similar to genuine random-scattered sequences, since they, like the latter, are uncorrelated, i.e. "pseudo-random". Strictly speaking, with a PRBS of pulse width w=1, the auto-correlation function R=s 1 s does not represent a delta function; rather, it represents for time intervals j greater than 0 a constant, which is independent of the time displacement in each particular case; i.e. the following applies:

$$R_j = \sum_{i=0}^{N-1} s_{i+j} s_i \qquad \text{mit} \quad \begin{array}{l} R_j = 2^{n-1} \ldots j = 0 \\ R_j = 2^{n-2} \ldots j \neq 0 \end{array} \qquad (2)$$

An example of a PRBS of length N=7 is the bit sequence (1, 1, 1, 0, 0, 1, 0), whereby the actual substance injection sequence x is derived from the PRBS by substituting every "1" in the sequence given by a pulse of width w (in this case, w=10) (see FIG. 5a).

The property indicated above of the sequence s now allows for the reconstruction of the electropherogram taken as the basis, and, specifically, by means of cross-correlation of the detector signal with a suitable function s, whereby the cross-correlation of the detector signal with the PRBS sequence x can be represented as a simple pulse of the form:

$$p = \bar{s} \otimes x \qquad (3)$$

The function $\bar{s}$ is derived in this situation from the corresponding PRBS sequence replacing the first "1" of each pulse by 2/(N+1) and each first "0" by −2/(N+1), and setting all other values equal to zero (see FIG. 5a and 5b); i.e. for w=1, s can be written as:

$$\bar{s}_i = \frac{2}{N+1}(2s_i - 1) \qquad (4)$$

As can easily be shown, the cross-correlation function $\bar{s}$ 1 s=δ(i) gives "1" for a time delay of zero, and otherwise "0". This means that s allows for the calculation of the desired value (3); i.e. the cross-correlation gives the original electropherogram E as with a single-pulse injection. Overall, therefore, we derive:

$$\begin{aligned} E &= \bar{s} \otimes y \qquad (5) \\ &= \bar{s} \otimes (x * h) \\ &= (\bar{s} \otimes [s * p]) * h \\ &= \delta * p * h \\ &= p * h \end{aligned}$$

The improvement indicated, relating to the signal-to-noise ratios, allows it to be easily demonstrated that, in the presence of an underground noise, the yield or amplification of the measured signal according to the invention corresponds to √N/2 times a conventionally measured signal with simple pulse injection; i.e. it is perceptibly higher.

I claim:

1. Microfluidic microchip for the chemical, physical, and/or biological analysis or synthesis of substances, with a channel structure, wherein the substances are capable of moving, in accordance with the channel structure, under the imposition of an electrical potential, comprising a channel structure with at least one leading channel connected in a substance conductive manner to at least one delivery channel for delivering the substances, and at least one discharge channel for discharging the substances at least two points of intersection, whereby between the point of intersection of the delivery channel and the leading channel on the one hand, and the point of intersection of the discharge channel and the delivery channel on the other, at least one leading channel section of predetermined length is formed;

a first activation source coupled to the areas of the delivery channel and the discharge channel for forming a potential for providing the substantially continuous movement of the substances from the delivery channel via the leading channel to the discharge channel;

at least a second activation source, coupled to the area of the leading channel section, for forming a pseudo-random modulated signal for causing pseudo-random modulated movement of the substances located in the leading channel section for forming separated substance volume units corresponding to the modulated signal.

2. Microfluidic microchip according to claim 1, further including a switching arrangement for temporally alternating activation of the first and the second activation sources, whereby the substances, in a first operating cycle, are capable of being led to the leading channel section, and whereby, in at least one second operating cycle, the substances located in the leading channel section can be drawn out from the leading channel section as separated substance volume units.

3. Microfluidic microchip according to claim 1, further including a channel structure with at least two discharge channels, whereby, between the point of intersection of the delivery channel and the leading channel on the one hand, and the points of intersection of the at least two discharge channels and the leading channel on the other, at least two leading channel sections are formed, whereby the activation sources for the area of the leading channel sections, and corresponding switching devices of the switching arrangement, are arranged for causing a substance volume unit formed in the first operating cycle and, if appropriate, extending over several leading channel sections to be drawn out of the leading channel section in the second operating cycle, as a cohesive substance volume unit.

4. Microfluidic microchip according to claim 3, wherein each of the leading channel sections includes a unit length, whereby several leading channel sections, taken together, correspond to an integral multiple, greater than one, of the unit length.

5. Microfluidic microchip according to claim 1, wherein the channel structure includes a buffer reservoir connected to the leading channel in a substance conducting manner, for providing intermediate storage of volume units drawn out of the leading channel section.

6. Microfluidic microchip according to claim 1, wherein the channel structure with a separation channel connected in a substance conductive manner to the leading channel, for accommodating the substance for enabling the performance of the chemical analysis or synthesis by time-controlled and/or amplitude-controlled delivery of the substance volume units out of the delivery channel or out of the buffer reservoir.

7. Microfluidic microchip according to claim 6, wherein the channel structure includes a collecting reservoir connected in a substance conductive manner to the separation channel for accommodating substances already processed in the separation channel.

8. Microfluidic microchip according to claim 1, wherein the first and second activation sources are arranged to derive different potential types.

9. Microfluidic microchip according to claim 8, wherein one of the activation sources is arranged for deriving an electric potential and one other one of the activation sources is arranged for deriving a mechanical potential.

10. Microfluidic microchip for the chemical, physical, and/or biological analysis or synthesis of substances, with a channel structure, wherein the substances are capable of being moved, in accordance with the channel structure under the imposition of an electrical potential, comprising a channel structure with at least one channel for conveying substances, the conveying channel being connected, in a substance conductive manner, to at least one point of intersection to at least one separation channel for performing the chemical analysis or synthesis, at least first activation source coupled to the area of the conveying channel for forming a potential for the substantially continuous movement of the substances in the conveying channel;

at least a second activation source coupled to in the area of the separation channel for forming a modulated potential for causing modulated movement of the substances located in the separation channel and for causing the substances undergoing modulated movement to be separated into substance volume units.

11. Microfluidic microchip according to claim 10, further including a switching arrangement for the temporally alternating activation of the first and second activation sources, whereby the substances are capable of being delivered, in a first operating cycle, to the delivery/discharge channel, and whereby, in at least a second operating cycle, the substances located in the delivery/discharge channel are capable of being drawn out as separated substance volume units from the delivery/discharge channel, and are capable of being delivered accordingly to the separation channel.

12. Microfluidic microchip according to claim 11 wherein the at least one delivery channel, at least one discharge channel, and at least one separation channel are connected to one another in a substance conductive manner at least one point of intersection.

13. Measuring device including the structure of claim 1, the measuring device being provided for the chemical, physical, and/or biological analysis or synthesis of substances, the device comprising a channel structure arranged so the substances are capable of being moved therein under the imposition of an electrical potential, at least a first generator for deriving a temporally substantially constant potential for causing substantially continuous movement of the substances in accordance with the channel structure for activating the first activation source;

at least a second generator for deriving a pseudo-random modulated signal for producing a pseudo-random modulated potential for the pseudo-random modulated movement of the substances in accordance with the channel structure for activating the second activation source.

14. Measuring device according to claim 1 wherein the first and second generators are combined in one signal generator.

15. Measuring device according to claim 13, further including a switching arrangement for temporally alternating operation of the first and second generators.

16. Measuring device according to claim 13, wherein the second generator includes a signal generator for generating pulsed signals with substantially constant amplitude and variable oscillation duration and/or phase.

17. Measuring device according to claim 16, wherein the second generator includes a square-wave generator.

18. Measuring device according to claim 13, further including a source of pseudo-randomly scattered binary digit sequences connected for triggering the second generator.

19. Measuring device according to claim 18, wherein the binary digit sequences are Hadamard sequences.

20. A method of operating a microfluidic microchip in a chemical, physical and/or biological analyzer or synthesizer of a substance, the microfluidic microchip including a channel structure having a delivery channel and a leading channel, the substance being of a type that moves in the channel structure in response to a potential being imposed thereon, the method comprising applying a temporally substantial constant potential to the substance while the substance is in the delivery channel to cause substantially continuous, uninterrupted movement of the substance in the delivery channel toward the leading channel, and applying a pseudo-random modulated signal to the substance while the substance is in the leading channel to cause pseudo-random modulated movement of the substance in the leading channel, the analyzer or synthesizer being responsive to the substance undergoing the pseudo-random modulated movement.

21. The method of claim 20 wherein the modulation is at least one of temporal, amplitude and phase.

22. The method of claim 20 wherein the modulation is sequentially at least a pair of temporal, amplitude and phase and the temporally substantially constant potential is sequential with the sequential modulation.

23. The method of claim 20 wherein the modulation is pulsed on at constant amplitude and has variable angle modulation.

24. The method of claim 20 wherein the modulation includes a sequence of square waves.

25. The method of claim 20 wherein the modulation includes pseudo-randomly scattered binary digit sequences.

26. The method of claim 20 wherein the modulation includes pseudo-randomly scattered binary digit Hadamard sequences.

27. The method of claim 20 further including performing a cross-correlation calculation on measured spectra derived from the substance, to which the analyzer is responsive by incorporating the injected substance volume flows and the resultant measured signal, for the determination of an electropherogram.

* * * * *